March 24, 1942.　　J. A. RUPPERT, JR　　2,277,415
LAWN EDGER
Filed March 26, 1940
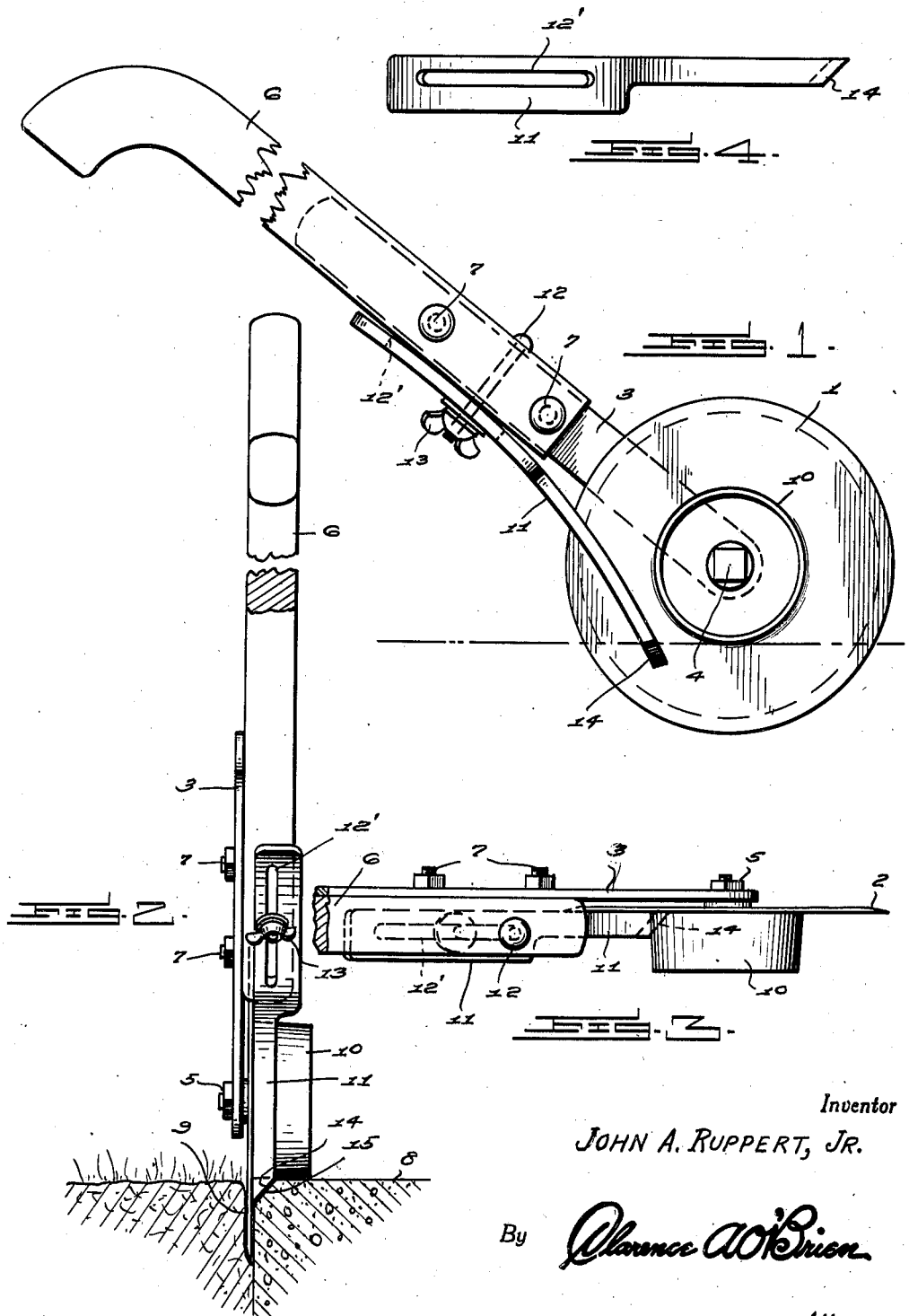
Inventor
JOHN A. RUPPERT, JR.
By Clarence A. O'Brien
Attorney Patented Mar. 24, 1942

2,277,415

UNITED STATES PATENT OFFICE 2,277,415

LAWN EDGER

John A. Ruppert, Jr., Riverton, N. J.

Application March 26, 1940, Serial No. 326,077

1 Claim. (Cl. 97—227)

My invention relates to improvements in lawn, or grass, edgers, so-called, for trimming lawn along the edges of walks.

The principal object of the invention is to provide a simply constructed implement of this character adapted to cut a groove in the lawn along the edge of a walk and which is equipped for the application of foot pressure thereto in operating on hard ground and for cutting a clean groove and cleanly shearing the grass along the groove.

Another object is to provide a lawn edger which is easy to operate, strong and durable, and comparatively inexpensive to manufacture.

To the accomplishment of the above, and subordinate objects presently appearing, a preferred embodiment of my invention has been illustrated in the accompanying drawing, set forth in detail in the succeeding description, and defined in the claim appended hereto.

In said drawing:

Figure 1 is a view in side elevation of the preferred embodiment of my invention, Figure 2 is a view in rear elevation, Figure 3 is a fragmentary view in top plan, and Figure 4 is a view in top plan of the edging blade.

Describing now my invention in detail with reference to the drawing by numerals, the basic element of the implement is a flat edging disc 1 of hard steel having a sharp edge formed by beveling the same, as at 2, and which is rotatably mounted on the front end of a bar-like metal shank 3 by means of an arbor 4 to operate alongside said shank in slightly spaced relation thereto. A nut 5 secures the arbor 4 to said shank. On the same side of the shank 3 as the disc 1 is a handle-bar 6, such as is used on hand cultivators and the like, bolted to said shank as at 7, to extend rearwardly therefrom parallel therewith, said handle-bar 6 terminating at its front end short of said disc 1 for obvious reasons.

The edging disc 1, as will be understood, is designed to be pushed along the lawn and alongside a walk 8 to dig, or cut, a groove 9 in the lawn with said disc running against the side of the walk. In this connection, it will be noted that the bevel 2 of disc 1 is on the side opposite the walk 8, on the back side of the disc, so that the sharp edge may be engaged with said side of the walk 8 to maintain said edge sharp.

Suitably secured to the side of the disc 1 opposite the shank 3, the front side of the disc, is a concentric annular drum 10 forming a roller smaller in diameter than said disc 1 and designed to run on the edge of the walk 8 to support the disc 1 so as to cut to a uniform depth and to which drum pressure may be applied, as by the foot of the operator, so as to force said disc 1 into hard ground. The drum 10 may be beveled away from the disc 1, if desired, to reduce frictional contact with the walk 8 and thus provide for easier operation.

A narrow edging blade 11 extends downwardly from the under edge of the handle-bar 6 and front end thereof alongside the front side, or face, of the disc 1, said blade being secured flat at one end to said handle-bar 6 and curving downwardly and forwardly with one edge opposed to the front side of said disc in wiping engagement therewith. A bolt 12 extending through said handle-bar 6 and through a longitudinal slot 12' in said blade with a wing nut 13 thereon provides for longitudinal and lateral adjustment of the edging blade 11 relative to said disc 1. The edging blade 11 is provided with a front end beveled laterally, as at 14, so as to provide a point operating in the groove 9, said end travelling along the usual beveled edge 15 with which such walks are usually provided. The described bevel 14 operates to pick up dirt and grass and throw the same up out of the groove 9 and also to cut any grass in the path thereof. The edge of the edging blade 11 in wiping engagement with the disc 1 serves to clean said disc on the front side thereof of dirt adhering thereto. Obviously, the described edging blade 11 may be adjusted as occasion may require.

The foregoing will, it is believed, suffice to impart a clear understanding of my invention, the operation and use of the same having been set forth in connection with the description of parts.

Manifestly the invention, as described, is susceptible of modification without departing from the inventive concept and right is herein reserved to such modifications as fall within the scope of the subjoined claim.

What I claim is:

A lawn edging implement comprising a handle-bar, an edging disc rotatably mounted on one end of said bar to be shoved by the latter over the lawn alongside a walk and thereby cut a groove in the lawn along an edge of said walk, a roller fast on said disc concentrically thereof to travel over the walk and support the disc for cutting at a uniform depth, and a flat edging blade extending downwardly and forwardly from said handle-bar partway across one face of the disc in edgewise scraping relation to said face and having a lower plow end laterally beveled to a point for digging said groove wider at the top thereof alongside the walk and fitting against a beveled edge of said walk, said plow point being disposed in the rear of the axis of the disc and roller whereby said blade may be raised and lowered under corresponding movement of said handle-bar about the axis of the disc to cause the plow end to dig at different depths while the disc is cutting at a uniform depth, said blade being forwardly bowed to obviate picking up grass and dirt.

JOHN A. RUPPERT, Jr.